(12) United States Patent
Kato

(10) Patent No.: US 6,738,151 B1
(45) Date of Patent: May 18, 2004

(54) DISTRIBUTED PROCESSING SYSTEM FOR IMAGE FORMING APPARATUS

(75) Inventor: Hiroyuki Kato, Ichikawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,457

(22) Filed: May 26, 2000

(51) Int. Cl.⁷ .............................................. G06K 15/00
(52) U.S. Cl. ........................................ 358/1.12; 358/1.9
(58) Field of Search ........................... 358/1.1, 1.4, 1.8, 358/1.9, 1.12, 1.13, 1.15, 2.1, 512, 515, 518, 538; 382/162, 167, 276; 399/39, 40, 49; 709/200, 201, 203

(56) References Cited

U.S. PATENT DOCUMENTS

| | | | | |
|---|---|---|---|---|
| 5,859,711 A | * | 1/1999 | Barry et al. ................. 358/296 |
| 5,978,559 A | * | 11/1999 | Quinion ..................... 358/1.15 |
| 6,035,103 A | * | 3/2000 | Zuber ......................... 358/1.9 |
| 6,219,155 B1 | * | 4/2001 | Zuber ......................... 358/1.9 |
| 6,606,165 B1 | * | 8/2003 | Barry et al. ................. 358/1.9 |
| 6,633,396 B1 | * | 10/2003 | Barry et al. ................ 358/1.14 |
| 6,636,326 B1 | * | 10/2003 | Zuber ........................ 358/1.14 |

* cited by examiner

Primary Examiner—Gabriel Garcia
(74) Attorney, Agent, or Firm—Foley & Lardner LLP

(57) ABSTRACT

A distributed processing system for an image recording network includes: a distributed processing server capable of applying distributed processing on one job which is inputted from a client and consists of a plurality of pages by at least two image recording apparatuses; at least two image recording apparatuses for recording the job on a recording sheet based on a command from this server; and storing means for performing storage by associating an image recording apparatus which has outputted said job with a page of the job outputted by this image recording apparatus. With such a structure, it is possible to provide the distributed processing system for an image recording network, which is capable of outputting with the constantly same coloring with respect to a color/black-and-white mixed manuscript in particular.

19 Claims, 14 Drawing Sheets

SYSTEM STRUCTURE OF COLOR DIGITAL COPIER
ADOPTING ONE-DRUM MODE

SYSTEM STRUCTURE OF COLOR DIGITAL COPIER
ADOPTING QUADRUPLE TANDEM MODE

OPERATION PORTION OF DIGITAL COPIER

COLOR RENDERING RANGE INFORMATION TABLE

| PRINTER | PROFILE |
|---|---|
| COLOR PRINTER 1 | PROFILE FOR COLOR PRINTER 1 |
| COLOR PRINTER 2 | PROFILE FOR COLOR PRINTER 2 |
| COLOR PRINTER 3 | PROFILE FOR COLOR PRINTER 3 |
| ... | ... |

FIG.6

PROFILE INFORMATION

| X | Y | Z | C | M | Y | K |
|---|---|---|---|---|---|---|
| 4.3 | 5.1 | 3.46 | 100 | 100 | 100 | 0 |
| 4.5 | 5.1 | 4.57 | 100 | 100 | 80 | 0 |
| ... | ... | ... | ... | ... | ... | ... |

FIG.7

FLOW OF COLOR RENDERING RANGE CORRECTION PROCESSING IN TANDEM PRINT/PICTURE QUALITY SMALL DIFFERENCE MODE

PRINTER DRIVER SCREEN

CONTROL PANEL SCREEN

FLOW OF COLOR RENDERING RANGE CORRECTION PROCESSING IN TANDEM COPY/PICTURE QUALITY SMALL DIFFERENCE MODE

FLOW OF JOB DISTRIBUTION PROCESSING IN TANDEM PRINT/HIGH PICTURE QUALITY MODE

FLOW OF JOB DISTRIBUTION PROCESSING IN TANDEM PRINT/MONOCHROME AND COLOR ALLOCATION MODE

FLOW OF JUDGMENT PROCESSING FOR "PAGE REQUIRING HIGH PICTURE QUALITY" 1

FLOW OF JUDGMENT PROCESSING FOR "PAGE REQUIRING HIGH PICTURE QUALITY" 2

FLOW OF ANALYSIS PROCESSING FOR MONOCHROME/COLOR PAGE NUMBER

DISTRIBUTED PROCESSING SYSTEM FOR IMAGE FORMING APPARATUS

BACKGROUND OF THE INVENTION

The present invention relates to a distributed processing system to which a plurality of image information supplying apparatuses such as a personal computer (which will be hereinafter referred to as a PC—Personal Computer—) or a digital camera and a plurality of image forming apparatuses such as a color plain paper copy machine (which will be hereinafter referred to as a PPC—Plane Paper Copy machine—) or a printer are connected and which is provided with a distributed processing server for executing load distribution of jobs, and more particularly to a distributed processing system capable of efficiently forming images at a high speed even if color reproduction capabilities of respective image forming apparatuses connected to this system are different from each other.

In regard to a problem of management of colors in the field of image forming techniques such as printing or copying, a property of human visual sense to colors must be first taken into consideration. "Color management!" by Toru Kasai describes this management of colors (color management) as follows.

"A human eye has a cone cell sensitive to red, green and blue. Quantifying the stimulation given to each cell results in XYZ.

The value of XYZ can be used to represent all the colors seen by a human being as numerical values, but such values vary in accordance with a change in brightness of illumination light even if the same color is seen. "A color of an object" can not be represented in this way.

Thus, in order to represent a color of an object which can not be indicated by XYZ, a numerical quantity of lower case xy is used. This is a value which performs notation by using a ratio which becomes 1 by summing up XYZ and in which z is omitted. When a graph is made by using this numerical value, a CIE xy chromaticity diagram can be obtained.

With the CIE xy chromaticity diagram, it can be known that what kind of color rendering range (capability for reproducing colors) an apparatus for representing colors has. For example, a monitor and an offset printer have different color rendering ranges. It can be said that color matching by using a color management system (CMS) is a function for conveniently making these different color rendering ranges consistent with each other."

As similar to the above-described CIE xy chromaticity diagram, the color range of visible light rays which can be reproduced by a human eye greatly exceeds a region which can be reproduced by an RGB (red-Red, green-Green, blue-Blue) model or a CMYK (cyan-Cyan, magenta-Magenta, yellow-Yellow, black-Black) model. The region of colors which can be reproduced by the RGB model and the CMYK model do not completely coincide with each other. Since the RGB and the CMYK are not completely compatible with each other, different colors may be reproduced at an output device if these models remain unchanged.

For the purpose of adjusting a difference between output devices, there is adopted an interface for a color management system (ICM) which is called "ICM" in "Windows 98" and called "ColorSync" in "MacOS." In this ICM, there is used a standard format called the "ICC profile" proposed by the international color consortium (ICC—International Color Consortium—). The ICC profile is a table indicating vales for conversion of a color model dependent on an apparatus and a color model independent on an apparatus. By using the ICC profile, the application reconverts a color processed in various input/output devices in order to transfer it to a different input/output device through a relay point with a device-dependent color space as a reference being used as a relay for conversion, thereby completing transfer of the color. Therefore, it is possible to absorb the inconformity of the reproducible color regions between the RGB model and the CMYK model to some degree.

Recently, a color printer of one-drum mode using an intermediate transfer medium has been spread, and the color/monochrome mixed printing environment has been regularized. The one-drum type color printer using the intermediate transfer medium, a print completion timing of a monochrome page is different from that of a color page because of the mechanism thereof. In case of the color printing, since toners for four colors of CMYK (cyan, magenta, yellow and black) are mounted for each one rotation, the drum makes four rotations until the printing is completed. In case of the monochrome printing, only one color of K (black) is used, and hence one revolution can suffice the drum until the printing is completed. According to this one-drum mode, the color printing requires the time which is four-fold of that of the monochrome printing even if the simple calculation is performed.

On the other hand, there is a color printer called a quadruple tandem. In the mechanism of the quadruple tandem, an exposure device and a developer are provided in each of the CMYK and drums for four of the CMYK are linearly arranged. As a result, the color printing can be performed by one pass and, when compared with the one-drum mode, it is characterized in that only one revolution of the drum is enough during the color printing and the color printing can be executed at a high speed.

In the recent circumstances of applications, opportunities for processing colors of, e.g., browsers or PDF files are increasing due to spread of integrative business applications such as Microsoft Word, Excel, PowerPoint and others and spread of the internet, and the environment where colors are processed together with conventional monochrome documents has been realized. For example, this is true to a business document and the like in which a descriptive document is represented in monochrome pages while statistics/graphs are represented in color pages and which deals with them as one document.

Based on these circumstances, a tandem copy/tandem print has been recently proposed. This tandem print/tandem copy mode distributes and processes print jobs/copy jobs in order to shorten the time until the end of the jobs. The structure takes such a form as that at least two color printing devices are connected to the distributed processing server. Performing the distributed processing on a print job generated by a print command from a PC with two copying machines by a client is called the "tandem print." Further, distributing a copy job to be processed in two copying machines is called the "tandem copy."

The conventional job distribution system has distributed a job to color printing devices having different engine characteristics simply every unit of copies. In addition, there is a system which determines a color/monochrome page in a print job in units of a job distribution server, memorizes to which color printer the color page is job-distributed, and transmits a job in a page unit to a printer which is equal to the color printer to which the previous transmission was made when that job has a turn in order to constantly perform output with the same coloring (see Japanese patent application laid-open No. 198533-1998).

However, the above-described prior art has the following problems.

In general, the color printer has a different color rendering range depending on an engine to be used. In cases where the different color printers are connected to the distribution server to carry out the tandem print/copy, their color rendering ranges differ from each other because of different engine characteristics of the respective color printers and, for example, when the distribution server simply carries out the job distribution in units of copies, there occurs a problem such that the colorings of output results are different from each other.

Moreover, in order to solve the above-described problem as in the Japanese patent application laid-open No. 198533-1998, there is a method in which the color printer to which a color page job was job-distributed is previously memorized in order to output with the same coloring and the job is transmitted to the printer equal to the color printer to which the previous transmission was made when that job has a turn in the next time, but this method takes a lot of trouble for a user with merging the color pages and the monochrome pages in order to put output materials in the proper page order after output since the job is distributed every page unit although the same coloring is guaranteed. When the monochrome pages and the color pages are kept together in a measure or when either the color/monochrome pages are extremely small in number, it is not troublesome, but when the color/monochrome pages have the substantially equal number and their pages are alternately mixed up, it takes a lot of trouble with the sorting operation.

Additionally, when the color pages and the monochrome pages are job-distributed simply every page unit, for example, when the number of monochrome pages is extremely small with respect to one print job and the print job is mainly constituted of the color pages, printing of the monochrome pages can be finished extremely faster, but there is a problem such that it takes time until printing of the color pages is completed. If a proportion of the color/monochrome pages with respect to one print job can be analyzed, when a difference between the color pages and the monochrome pages is equal to or above a predetermined value, the job distribution every page unit can be eliminated and replaced with the conventional job distribution in units of copies, thereby shortening the time until printing is completed.

SUMMARY OF THE INVENTION

It is an object of the present invention to save labor for a sorting operation after print output and to realize a coloring uniformity of output results between different output devices by compensating a color printer having the engine characteristic of a high color reproduction capability to be matched with a color reproduction space of another color printer having the engine characteristic of a low color reproduction capability, and then distributing a job every copy unit instead of a page unit, when tandem print/copy is carried out between the color printers having different engine characteristics.

Further, there is such a merit that a memory of a client PC is less used by holding a profile of color rendering range information on a printer controller, as compared with a case where an arithmetic operation information profile is held on the client PC. Furthermore, it is another object to save the labor of a user that a profile is installed to the client PC.

Moreover, in the present invention, there is a merit such that a user can obtain an expected output result with respect to a page in which a high picture quality is particularly required among color pages by distributing a job to a color printer having the engine characteristic with the high color reproduction capability every page unit in case of a page in which a high picture quality is required and by distributing a job to a color printer having the engine characteristic with the low color reproduction capability every page unit in case of any other pages. However, the sorting operation is produced after the print output in this method.

To achieve the above-mentioned aim, a distributed processing system for an image forming apparatus according to a basic structure of the present invention comprises a client for supplying an image; a distributed processing server capable of performing distributed processing for one job, which is inputted from the client and which consists of a plurality of pages, by a plurality of image forming apparatuses including at least one color image forming apparatus; and at least two image forming apparatuses which perform image formation of the job on a recording sheet based on a command from the server and which are different from each other in color image formation processing capability, the distributed processing server comprising a storage portion for previously storing data concerning the respective image formation processing capabilities including color reproduction capabilities in the plurality of image forming apparatuses; a job analysis potion for analyzing contents of the job supplied from the client and an image formation request of the client concerning this job; a comparison portion for comparing a result of analysis by the job analysis portion with the data concerning capabilities of the plurality of image forming apparatuses stored in the storage portion; a correcting portion for correcting the image formation contents of a job to be supplied to the image forming apparatus having a high image formation capability based on a result of comparison by the comparison portion in accordance with the capability of the image forming apparatus having a low image formation processing capability to generate an image formation command for carrying out image formation with the corrected contents; and an output portion for distributing and outputting the job corrected by the correction portion to each of the plurality of image forming apparatuses, the image forming apparatus having the high image formation capability among the plurality of image forming apparatuses comprising an interpretation portion for interpreting the image formation command added to the corrected job supplied from the distributed processing server; and an execution portion for executing image formation in accordance with the interpreted contents.

Additionally, in the distributed processing system for the image forming apparatus according to the above-described basic structure, the plurality of image forming apparatuses may include a plurality of color image forming apparatuses for executing one color image forming job consisting of a plurality of pages inputted from the client, and the distributed processing server may correct a color reproduction space of a job to be supplied to a first color image forming apparatus having the engine characteristic with a high color reproduction capability so as to be matched with a color reproduction space of a second color image forming apparatus having an engine characteristic with a low color reproduction capability and thereafter output it to the first color image forming apparatus.

Moreover, in the distributed processing system for the image forming apparatus according to the above-described basic structure, in the distributed processing server capable of performing distributed processing for one job consisting of a plurality of pages inputted from a client by at least two color image forming apparatuses, color reproduction space information of each color image forming apparatus may be held in the distributed processing server; the distributed processing server may use the held information to correct a color image forming apparatus having an engine characteristic with a high color reproduction capability so as to be matched with the color reproduction space of the color image forming apparatus having an engine characteristic with a low color reproduction, thereby performing image formation.

Further, in the distributed processing system for the image forming apparatus according to the above-described basic structure, a job may be distributed to the color image forming apparatus having an engine characteristic of a high color reproduction capability every page unit to form an image in case of a page in which a high picture quality is required, and a job may be distributed to the image forming apparatus having an engine characteristic with a low color reproduction capability every page unit to form an image in case of any other page.

Additionally, in the distributed processing system for the image forming apparatus according to the above-described base structure, the image forming apparatus having the high image formation processing capability may be constituted of a first image forming apparatus adopting a quadruple tandem color mode; the image forming apparatus having the low image formation processing capability may be constituted of a second image forming apparatus adopting a one-drum mode; a job is distributed to the second image forming apparatus every page unit in case of monochrome pages; and a job is distributed to the first image forming apparatus adopting the quadruple tandem color mode every page unit in case of color pages, thereby subjecting image formation to distributed processing.

As apparent from the above-mentioned structure, in the present invention, a user can have a wide range of selection and a service that a user expects can be satisfied by providing means for enabling by a control panel attached to a printer driver/printer a user to select a method in which "a color printer having the engine characteristic with the high color reproduction capability is corrected to be matched with a color reproduction space of a color printer having the engine characteristic with the low color reproduction capability and a job is distributed in units of copies" and a method in which "a job is distributed to a color printer having the engine characteristic with the high color reproduction capability every page unit in case of a page in which a high picture quality is required and a job is distributed to a color printer having the engine characteristic with the low color reproduction capability every page unit in case of any other page." That is, the present invention includes the structure such that a user can select either the time or the picture quality.

Also, in the present invention, the time until a print output result is obtained can be reduced by a mode by which a job is distributed to a color printer adopting a one-drum mode every page unit in case of a monochrome page and a job is distributed to a color printer adopting a quadruple tandem mode every page unit in case of a color page. This is the reduction in time which can be realized by execution of the job distribution by effectively exploiting the respective engine characteristics such that the color printing is carried out at a high speed in the quadruple tandem mode and the monochrome printing is conducted at a high speed in the one-drum mode.

Additionally, in the present invention, there are provided analyzing means for analyzing how many color pages and how many monochrome pages one print job has and means for switching back to the job distribution in units of copies when a difference between the color pages and the monochrome pages in number is equal to or above a fixed ratio, and a final print output time can be hence minimized by utilizing information of a constitutional ratio of the monochrome/color pages in the print job.

BRIEF DESCRIPTION OF THE DRAWINGS

In the accompanying drawings:

FIG. 6 is a chart showing an example of a color rendering range information table;

FIG. 7 is a chart showing an example of profile information;

DESCRIPTION OF THE EMBODIMENTS

Preferred embodiments of a distributed processing system for an image forming apparatus according to the present invention will now be described in detail hereinafter with reference to the accompanying drawings.

Figure 1:
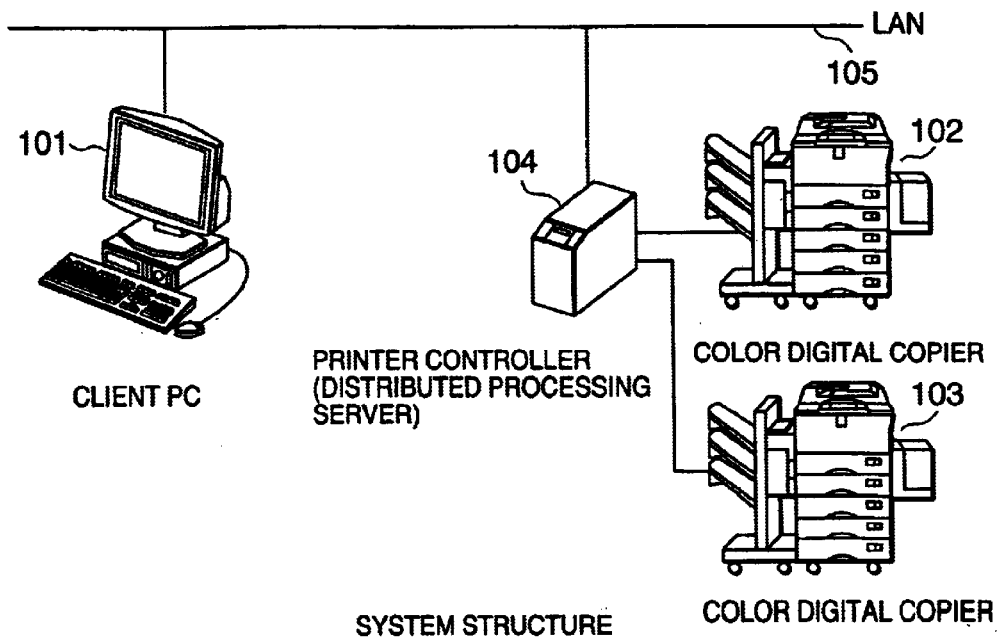
FIG. 1 is an explanatory view showing the entire system structure of a distributed processing system for an image recording network according to a preferred embodiment of the present invention.

FIG. 1 shows the entire system structure of a distributed processing system according to a preferred embodiment of the present invention. In FIG. 1, a client PC 101 for activating an application to direct printing, color digital copying machines 102 and 103, and a printer controller 104 for controlling a scan function/print function and the like of the color digital copying machines 102 and 103 are connected on a network 105.

Figure 2:
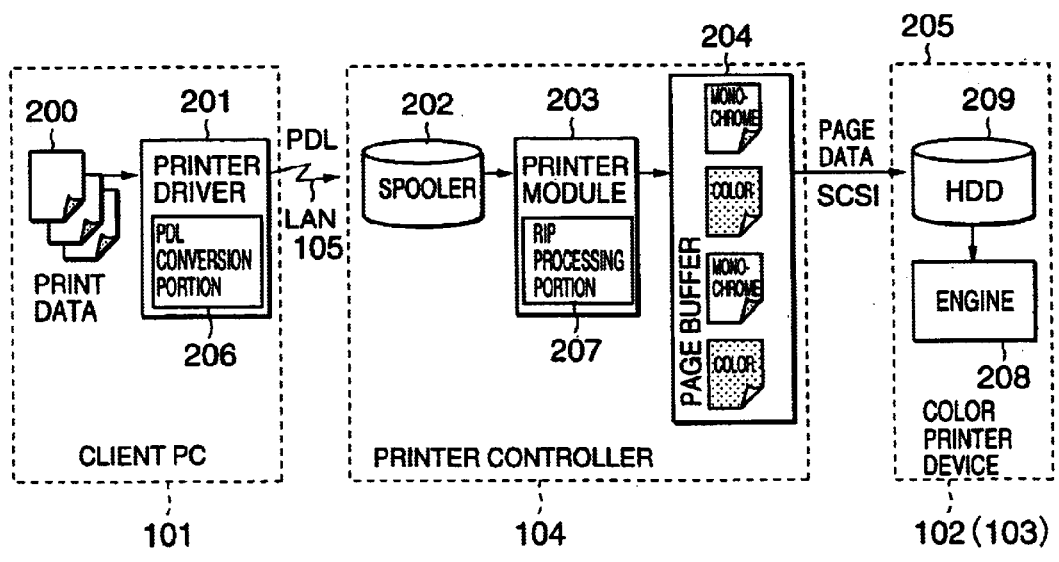
FIG. 2 is a block diagram showing a system module structure of a printer operation.
Figure 5:
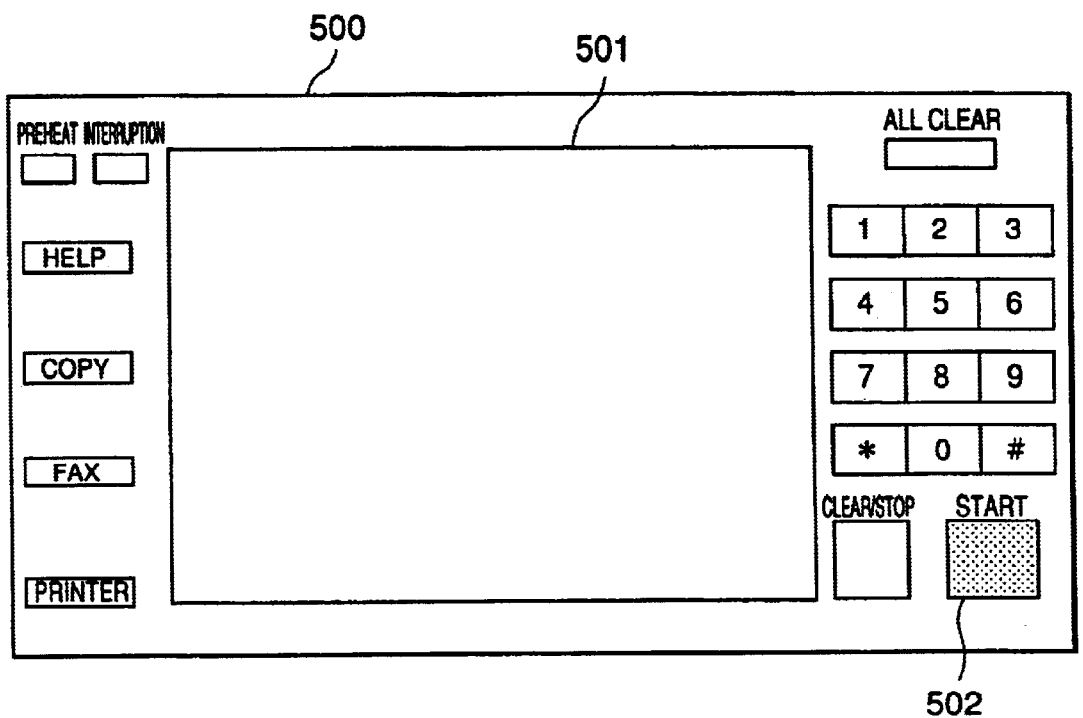
FIG. 5 is a plane view showing an operation portion of a digital copying machine.

Each of the color digital copying machines 102 and 103 is constituted of: an engine 208 such as shown in FIG. 2 including a scanner for scanning a paper manuscript to digitalize as image data and a printer for printing the image data on paper; an operation portion 50 such as shown in FIG. 5; a CPU for controlling the whole; a memory and a hard disk drive (which will be abbreviated as HDD hereinafter) 209 for storing a control program and management data (see FIG. 2); and a communication portion connected to the controller 104.

The color digital copying machines 102 and 103 respectively have a copying function from a paper manuscript copy to a sheet of paper. Since this copying function is the same function as a prior art copying machine, its explanation is omitted (Cf. Annapurna and McKinley).

Further, the controller 104 has a print function for receiving a print command written in a page description language (PDL) from a documentation software operating on the client PC 101, creating image data from the PDL and printing the image data on a sheet of paper in the color digital copying machine 102 or 103. This function is similar to that in a general network printer. The controller 104 is connected to at least two or more copying machines, for example, the color digital copying machines 102 and 103. It has a function for creating the image data from the PDL data generated by the client PC 101 and distributing a print job to each color digital copying machine. As a unit for distribution, there are a unit of copies and a unit of pages.

With reference to FIG. 2, a flow of the processing by the printer will now be described in detail. FIG. 2 shows a module structure and a flow of data when the printer operates.

A graphics device interface (Graphics Device Interface: which will be abbreviated as GDI hereinafter) 200 is an application program interface (Application Program Interface: which will be abbreviated as API hereunder) for carrying out data communication between an application program such as a documentation software and the printer and manages graphic elements.

A printer driver 201 generates print data to be outputted to the printer. The printer driver 201 is connected to the GDI 200 and constituted to convert the image data into print data which can be interpreted by the printer based on a drawing command from the GDI 200.

For example, when printing is directed by the application, the GDI data is converted into PDL by a PDL conversion portion 206 of the printer driver 201. In the printer driver 201, it is possible to recognize whether the page is a color page or a monochrome page based on the data given by the application. Subsequently, the data converted into the PDL becomes a data stream as one print job to be transferred to a spooler 202 of the printer controller 104 through a LAN 105. To the printer controller 104 is provided a portion called a printer module 203 where RIP (Raster Image Processor) processing is executed.

The RIP processing is a processing for image-developing the PDL to a bit map. The image development is performed in a portion called a page buffer 204 every page unit. When developed, it is possible to determined whether it is a color page or a monochrome page. The image data developed in the page buffer 204 every page unit is then transferred to a HDD 209 included in a color digital copying machine (102 and 103). Thereafter, the data is transferred to the engine 208 to be printed.

Figure 3:
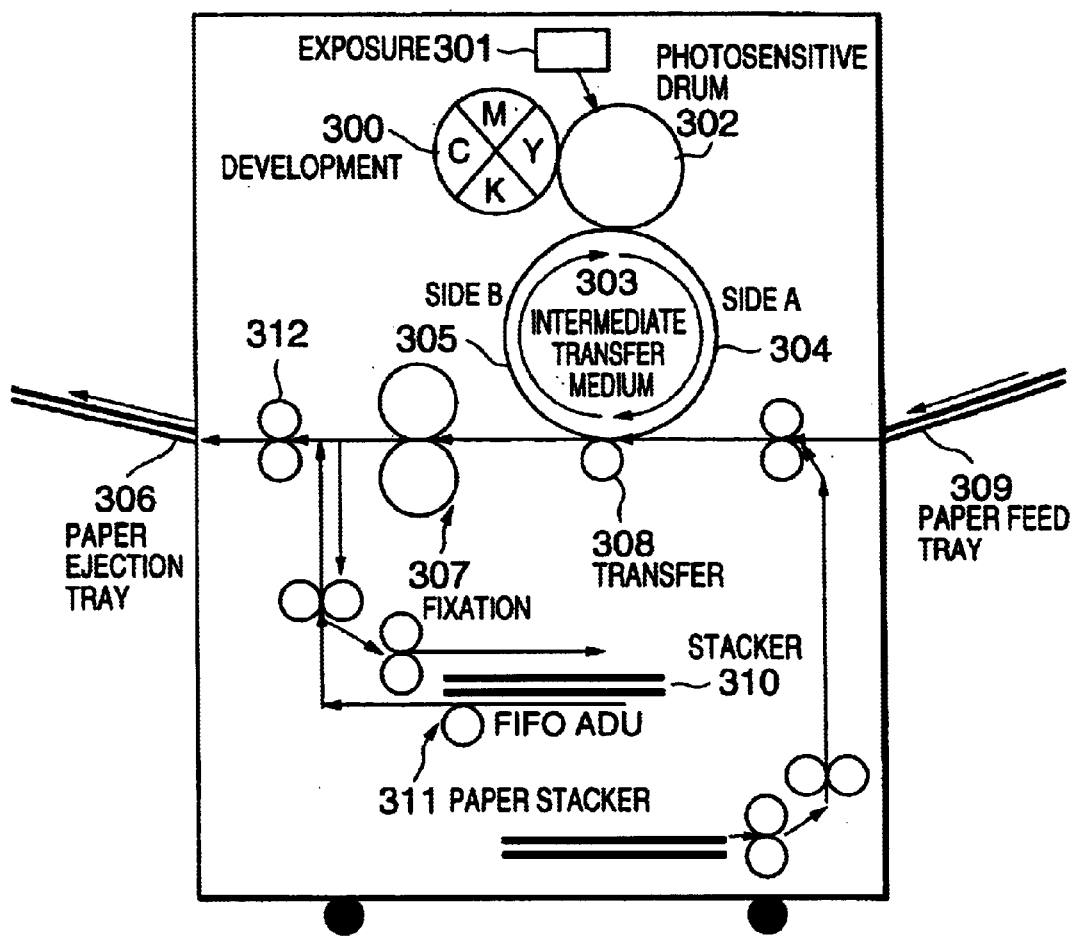
FIG. 3 is an explanatory view showing a system structure of a printer portion of a color digital copying machine adopting a one-drum mode.

FIG. 3 shows the system structure of a printer portion in a color digital copying machine adopting a one-drum mode. An electrostatic latent image is first formed on a photosensitive drum 302 by an exposure device 301, and toners are switched in the order of Y (yellow), M (magenta), C (cyan) and K (black) by a development device 300 to execute development. The developed image is transferred to an intermediate transfer medium 303 having a superficial area corresponding to two sheets of A4 size paper (one sheet of A3 size paper). One of the two sheets of A4 size paper is called an A side 304, and the other is called a B side 305. In case of development of a monochrome image, only the toner for one color of K is transferred to the intermediate transfer medium. In case of development of a color image, toners for four colors of YMCK are superimposed on the intermediate transfer medium in order.

Copy paper fed from a paper feed tray 309 or a paper stacker 310 makes one revolution and the toner is transferred on the copy paper in a transfer portion 308 in case of a monochrome image, whilst it makes four revolutions and the toners for four colors of YMCK are transferred onto the copy paper while being mounted on the intermediate transfer medium in case of a color image. The toner is then fused and fixed on the copy paper by a fixation portion 307 and the copy paper is delivered to a paper ejection tray 306 by a paper ejection roller 312. When the color pages/ monochrome pages are mixed, FIFO ADU may be used in order to keep the proper page order in a document, and the copy paper on which the image is fixed by the fixation portion 307 is temporarily stocked in the stacker 310. The copy paper is then delivered to the paper ejection tray 306 by the paper ejection roller 312 when that page to be ejected has a turn.

As compared with the quadruple tandem mode, the on-drum mode has merits such as that positioning of CMYK is facilitated, the cost of the apparatus is low and monochrome printing is fast. On the other hand, this mode has a demerit such that color printing is slow because four revolutions are required until printing of one sheet is completed.

Figure 4:
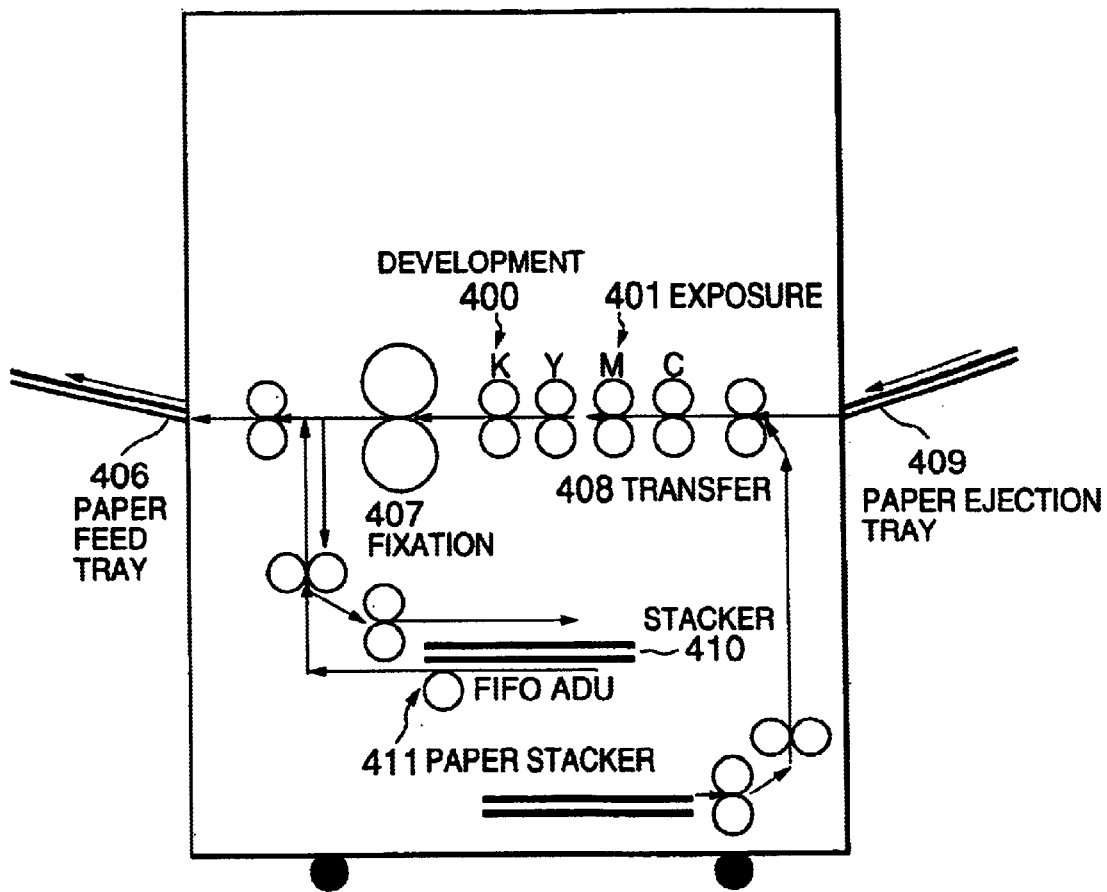
FIG. 4 is an explanatory view showing a system structure of a printer portion of a color digital copying machine adopting a quadruple tandem mode.

FIG. 4 shows the system structure of a printer portion in a color digital copying machine adopting the quadruple tandem mode. As compared with the one-drum mode explained with reference to FIG. 3, the quadruple tandem is different from the one-drum mode in that four rollers of Y (yellow), M (magenta), C (cyan) and K (black) are arranged as an exposure device 401 and a development device 400. A transfer portion 408 consisting of the corresponding four transfer rollers is mounted on the four rollers associated with the respective colors, and an image formed on this transfer portion 408 is transferred to the copy paper and fixed in a fixation portion 407.

Reference numeral 409 denotes a paper feed tray; 406, a paper ejection tray; 410, a stacker; and 411, a paper stacker. These configurations have the structure similar to the system structure of the one-drum mode depicted in FIG. 3. As a merit of the quadruple tandem mode, there is a merit such that printing is fast even in case of color print. On the contrary, there are demerits that positioning of CMYK is difficult and the cost of the apparatus is high.

FIG. 5 shows an operation portion of the color digital copying machine. The operation portion is constituted of a portion called a hard key (an after heat key, an interruption key, a HELP key, a copy key, a fax key, a printer key, an all-clear key, a 10-key keypad, a clear/stop key and a start key) and a control panel 501 composed of a touch panel. Functions provided by the present invention are mainly given by the control panel 501 and the start key 502.

FIG. 6 shows the structure of a color rendering range information table. The color rendering range information table exists on a memory of the printer controller 104 and is a table to which the printer controller has access if necessary. This information is supplied in the form of a file when the printer controller is set up. The color rendering range information table is configured to have profile information for each color printer.

FIG. 7 shows the structure of the profile information. The profile information is, for example, an ICC profile. The profile information corresponds to information indicative of a color rendering range in an engine characteristic of the color printer. The color rendering range is indicated by a matching table of a parameter of XYZ which is a device-independent color space and a numeric value of CMYK.

Figure 8:
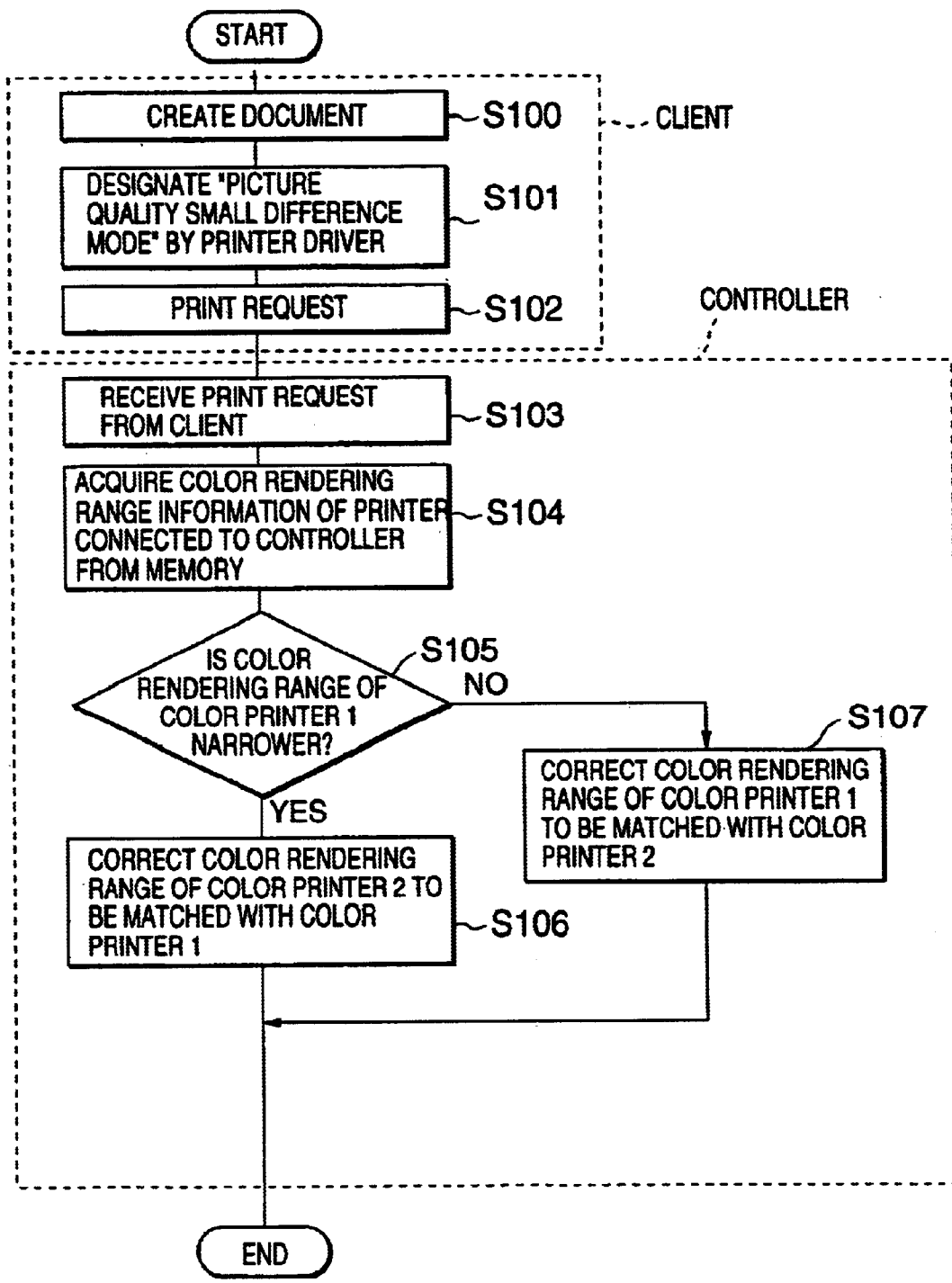
FIG. 8 is a flowchart showing a flow of the color rendering range correction processing in a tandem print/image quality small difference mode.
Figure 9:
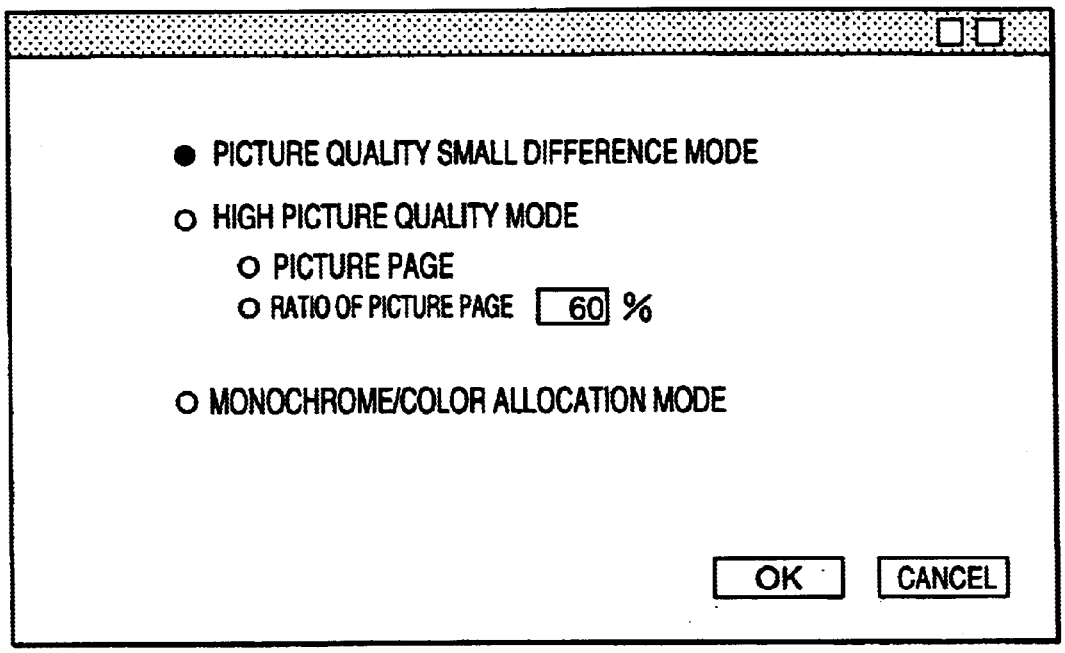
FIG. 9 is an explanatory view showing a printer driver screen.
Figure 10:
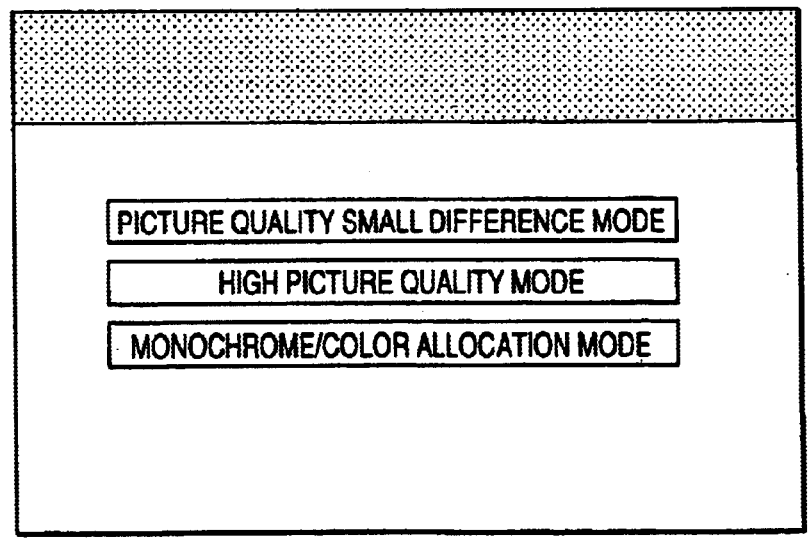
FIG. 10 is an explanatory view showing a control panel screen.

FIG. 8 shows a flow of "the color rendering range correction processing in the tandem print/image quality small difference mode" according to the present invention. A document is first created by a documentation application on the client PC 101 by an operator (S100). Subsequently, when a print command is issued from the application, a printer driver screen shown in FIG. 9 appears and the "image quality small difference" mode is selected (S101). When an "OK" button is selected, a print request is transferred from the client PC 101 to the printer roller 104 through the LAN 105. Upon receiving the print request from the client PC 101 (S103), the printer controller 104 fetches the color rendering range information of the color printers 102 and 103 connected to the printer controller 104 from the memory of the printer controller 104 (S104). The color rendering range information table and the color printer profile such as shown in FIGS. 6 and 7 exist on the memory of the printer controller. The printer controller 104 compares the color rendering range of the color printer 102 with that of the color printer 103 from the obtained color rendering range information for wideness/narrowness (S105) and, if the color rendering range of the color printer #1 (102) is narrow (Yes in S105), the color rendering range of the color printer #2 (103) is corrected so as to be matched with that of the color printer #1 (102) (S106). Further, if the color printer #1 (102) has the wider color rendering range (No in S105), the color rendering range of the color printer #1 (102) is corrected so as to be matched with that of the color printer # (103) (S107).

Figure 11:
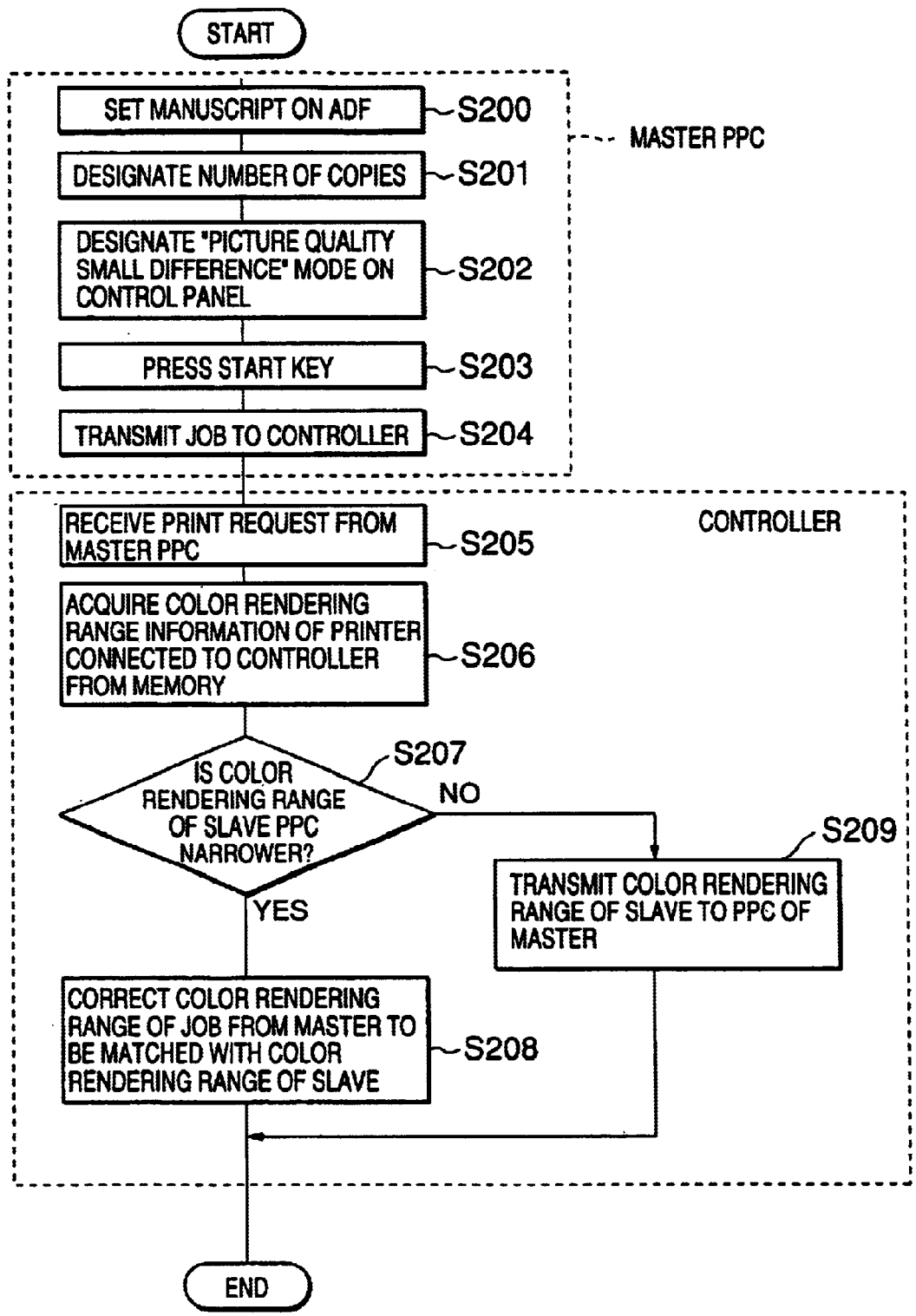
FIG. 11 is a flowchart showing a flow of the correction processing for a color rendering range in a tandem copy/image quality small difference mode.

FIG. 11 shows a flow of "the color rendering range correction processing in the tandem copy/image quality small difference mode" according to the present invention.

An operator first puts a manuscript to be copied on an ADF of one of the two color printers (S200) and specifies the number of copies by using the ten-key keypad on the control panel 500 depicted in FIG. 5 (S201). Here, it is determined that the color printer #1 (color printer 102) having the manuscript mounted on the ADF thereof is referred to as a master side whilst the other color printer #2 (color printer 103) is referred to as a slave side. The start key 402 on the control panel 400 is then pressed to start copy (S202). Upon accepting initiation of copy by pressing the start key, the color printer #1 (102) feeds the manuscript on the ADF to start scanning and accumulates an image data file scanned for each page in the HDD. At the same time, in order to print the scanned image data from the other color printer #2 (103), the printer controller 104, upon receiving the image data from the color printer #1 (102), fetches the color rendering range information of the color printers 102 and 103 connected to the printer controller 104 from the page buffer 204 as a memory of the printer controller 104 (S204). The color rendering range information table and the color printer profile such as shown in FIGS. 6 and 7 exist on the page buffer 204 as a memory of the printer controller 104. The printer controller 104 compares the color rendering range of the color printer 102 (master) with that of the color printer 103 (slave) from the obtained color rendering range information for wideness/narrowness (S205) and, if the color rendering range of the color printer #1 (102) is narrow (Yes in S205), the color rendering range of the color printer #2 (103) (slave) is corrected so as to be matched with that of the color printer #1 (102) (S206). Further, if the color rendering range of the color printer #1 (102) is wider (No in S205), the color rendering range of the color printer #1 (102) is corrected so as to be matched with that of the color printer #2 (103) (S207).

Figure 12:
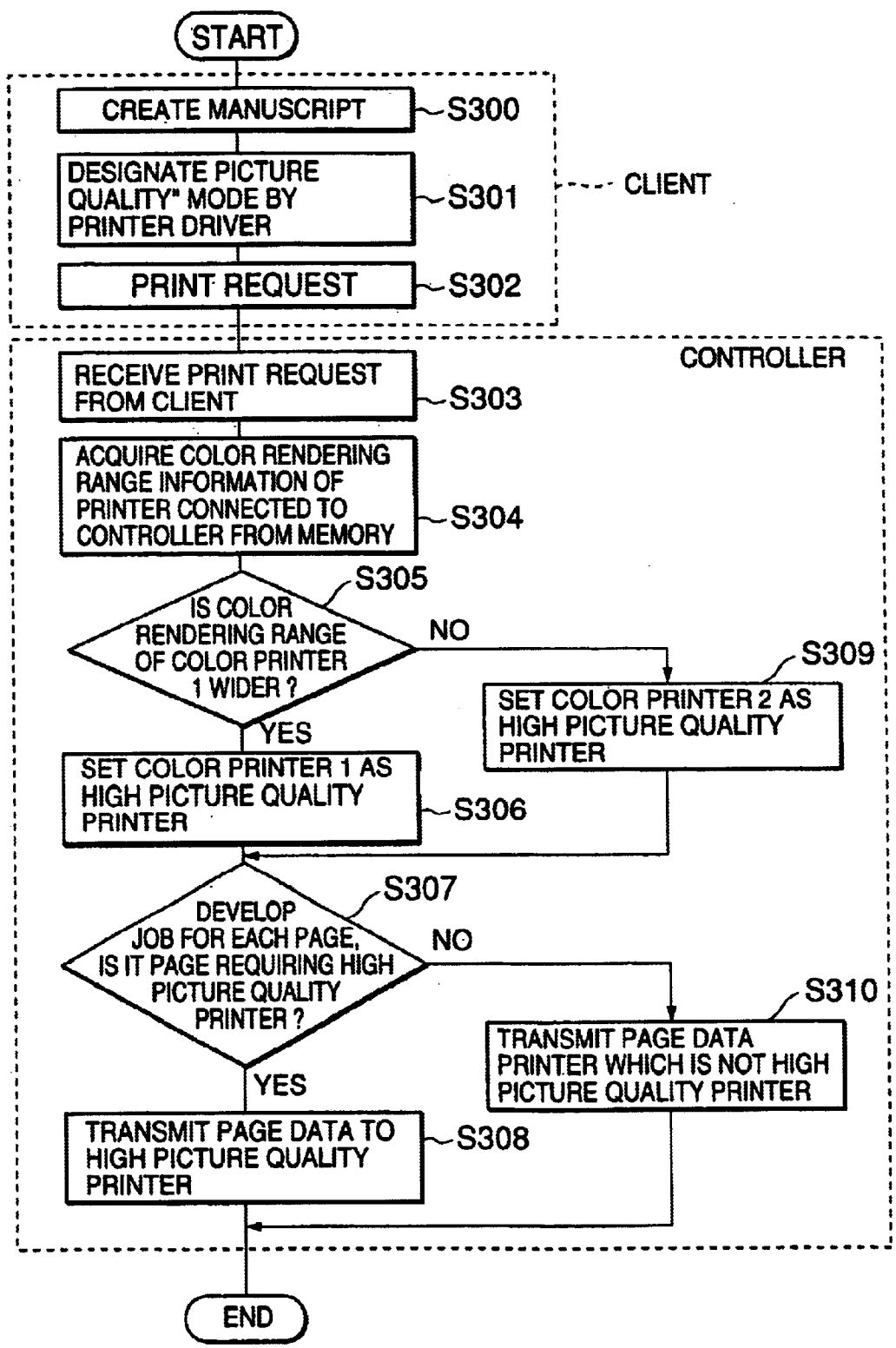
FIG. 12 is a flowchart showing a flow of the job distributed processing in a tandem print/high picture quality mode.

FIG. 12 shows a flow of "the job distributed processing in the tandem print/high picture quality mode" according to the present invention.

An operator first creates a document by the documentation application on the client PC 101 (S300). Subsequently, when a print command is issued from the application, the printer driver screen shown in FIG. 9 appears and the "high picture quality" mode is selected (S301). When an "OK" button is selected, a print request is transferred from the client PC 101 to the printer controller 104 through the LAN 105 (S302). Upon receiving the print request from the client PC 101 (S303), the printer controller 104 fetches the color rendering range information of the color printers 102 and 103 connected to the printer controller 104 from the memory of the printer controller 104 (S304). The color rendering range information table and the color printer profile such as shown in FIGS. 6 and 7 exist on the memory of the printer controller. The printer controller 104 compares the color rendering range of the color printer 102 with that of the color printer 103 from the obtained color rendering range information for wideness/narrowness (S305) and, if the color rendering range of the color printer #1 (102) is wide (Yes in S305), the color printer #1 (102) is set as a high picture quality printer (S306). Further, if the color rendering range of the color printer #1 (102) is narrow (No in S305), the color printer #2 (103) is set as the high picture quality printer. The print job transmitted from the client PC 101 is then developed in accordance with each page as described with reference to FIG. 2, and a judgment is made upon whether it is a page in which the high picture quality is required (S307). As a gauge, if it is a page including a color picture or a ratio of a color picture occupying that page is large for example, that page is determined as a page requiring the high picture quality. In case of a page requiring the high picture quality (Yes in S307), the page data is transmitted to the high picture quality printer (S307). Furthermore, if the page is determined as a page requiring no high picture quality (No in S307), the page data is transmitted to the printer which is not the high picture quality printer. For example, if the color printer #1 (102) is set as the high picture quality, the page in which the high picture quality is required is transmitted to the color printer #1 (102). In addition, the page in which no high picture quality is required is transmitted to the color printer #2 (103).

Figure 13:
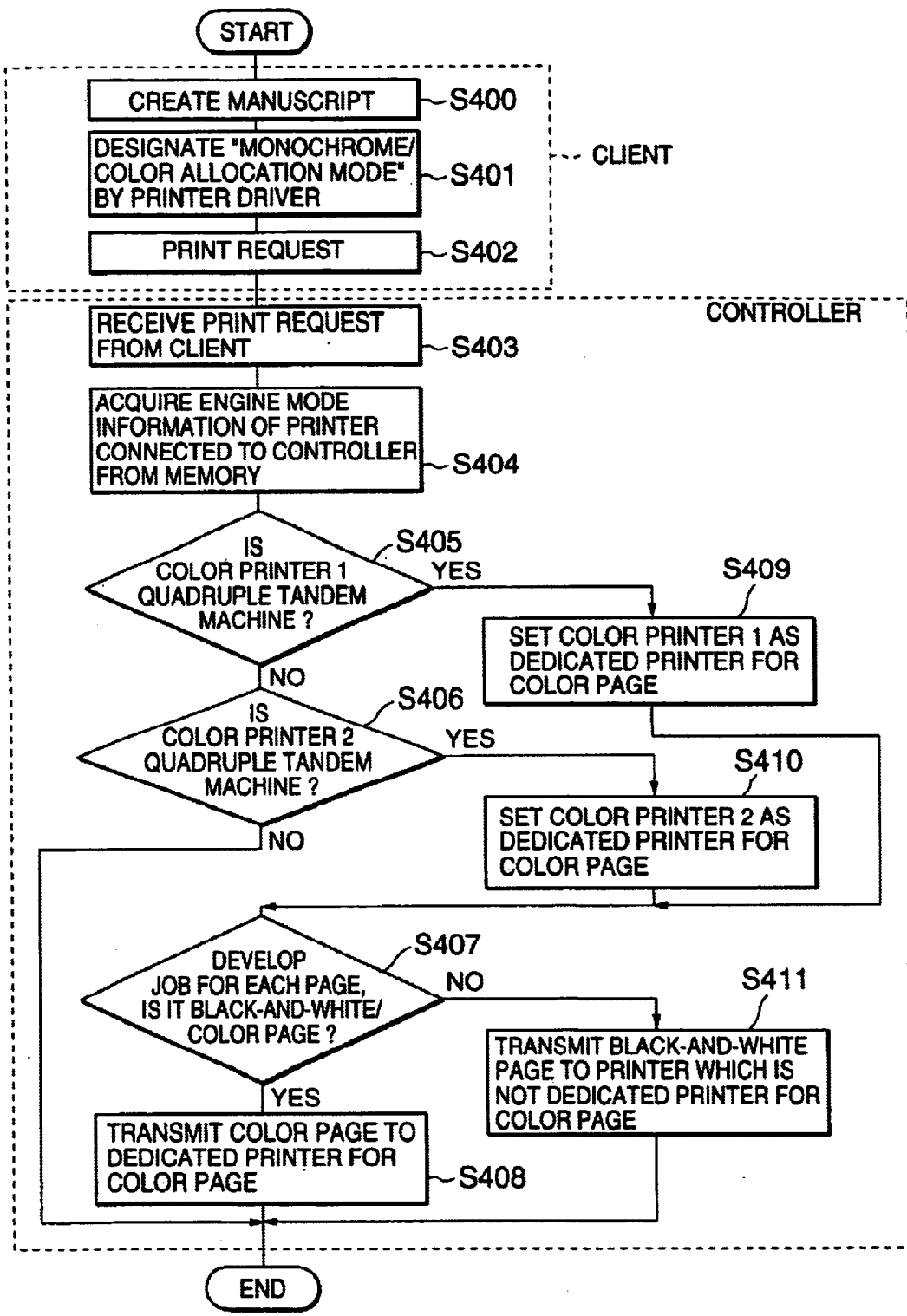
FIG. 13 is a flowchart showing a flow of the job distributed processing in a tandem print/monochrome and color allocation mode.

FIG. 13 shows a flow of "the job distributed processing in the tandem print/monochrome and color allocation mode" according to the present invention.

An operation first creates a document by the documentation application on the client PC 101 (S400). Then, when a print command is issued from the application, the printer driver screen shown in FIG. 9 appears and the "monochrome/color allocation" mode is selected (S401). When the "OK" button is selected, a print request is transmitted from the client PC 101 to the printer controller 104 via the LAN 105 (S402). The printer controller 104, upon receiving the print request from the client PC 101 (S403), acquires engine mode information of the color printers 102 and 103 connected to the printer controller 104 from the memory of the printer controller 104 (S404). The engine mode information is information indicative of the one-drum mode or the quadruple tandem mode. The printer controller 104 first makes a judgment upon whether the color printer #1 (102) is a quadruple tandem machine based on the obtained engine mode information (S405). If the color printer #1 (102) adopts the quadruple tandem mode (Yes in S405), the color printer #1 (102) is set as a dedicated printer for color pages. Further, if the color printer #1 (102) is not the quadruple tandem machine (No in S405), a judgment is then made upon whether the color printer #2 (103) is the quadruple tandem machine (S405). If the color printer #2 (103) adopts the quadruple tandem mode (Yes in S406), the color printer #2 (103) is set as a dedicated printer for color pages. The print job transmitted from the client PC 1012 is then developed as described with reference to FIG. 2, and a judgment is made upon whether it is a black-and-white page or a color page (S407). If it is a color page (Yes in S307), the page data is transmitted to the color dedicated printer (S408). Further, in case of a black-and-white page (No. in S407), the page data is transmitted to the printer which is not the color dedicated printer. For example, when the color printer #1 (102) employs an engine of the quadruple tandem mode, the color printer #1 (102) is set as the color dedicated printer. In this case, the color page is transmitted to the color printer #1 (102), and the black-and-white page is supplied to the color printer #2 (103). If the both printers are the quadruple tandem machines, or if the both printers are not the quadruple tandem machines, the color page/black-and-white page allocation is not executed.

Figure 14:
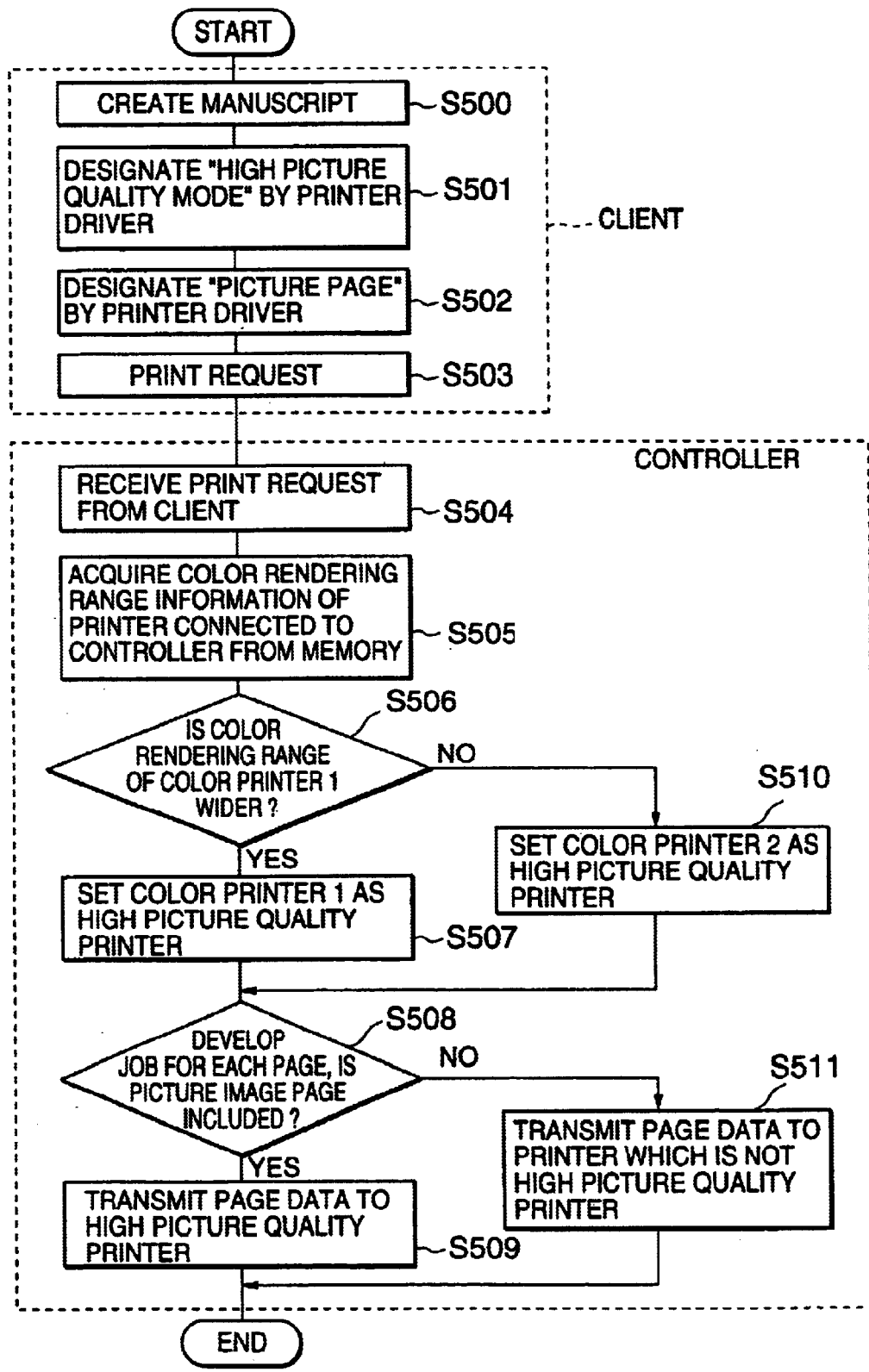
FIG. 14 is a flowchart showing a first flow of the judgment processing for a "page in which a high picture quality is required"

In the distributed processing system according to the present invention, FIG. 14 shows a flow of first processing when a page including a raster image page is determined as a page in which the high picture quality is required in a concrete example where a job for a page in which the high picture quality is required is distributed to a color image forming apparatus having the engine characteristic with the high color reproduction capability every page unit. FIG. 14 is a flowchart showing a first flow of "a page in which the high picture quality is required."

An operator first creates a document by a documentation application on the client PC 101 (S500). Subsequently, when a print command is issued from the application, the printer driver screen shown in FIG. 9 appears and the "high picture quality" mode is selected (S501). In the "high picture quality" mode, a page in which the high picture quality is required is designated under the condition that a "picture page" is included (S502). When the "OK" button is selected, a print request is transmitted from the client PC 101 to the printer controller 104 through the LAN 105 (S503). Upon receiving the print request from the client PC 101 (S504), the printer controller 104 acquires the color rendering range information of the color printers 102 and 103 connected to the printer controller 104 from the memory of the printer controller 104 (S505). The color rendering range information table and the color printer profile such as shown in FIGS. 6 and 7 exist on the memory of the printer controller. The printer controller 104 compares the color rendering range of the color printer 103 with that of the color printer 104 from the obtained color rendering range information for wideness/narrowness (S506) and, if the color rendering range of the color printer #1 (102) is wide (Yes in S506), the color printer #1 (102) is set as the high picture quality printer (S507). Further, if the color printer #1 (102) has the narrow color rendering range (No in S506), the color printer #2 (103) is set as the high picture quality printer. Subsequently, the print job transmitted from the client PC 102 is developed in accordance with each page as described with reference to FIG. 2, and a judgment is made upon whether it is a page in which the high picture quality is required under the judgment condition that a page includes a picture image (S508). If it is a page in which the high picture quality is required (Yes in S508), the page data is transmitted to the high picture quality printer (S509). Additionally, in case of the page which is determined as a page in which the high picture quality is not required (No in S508), the page data is transmitted to the printer which is not the high picture quality printer. For example, when the color printer #1 (102) is set as the high picture quality printer, the page in which the high picture quality is required is transmitted to the color printer #1 (102). Moreover, the page in which no high picture quality is required is transmitted to the color printer #2 (103).

Figure 15:
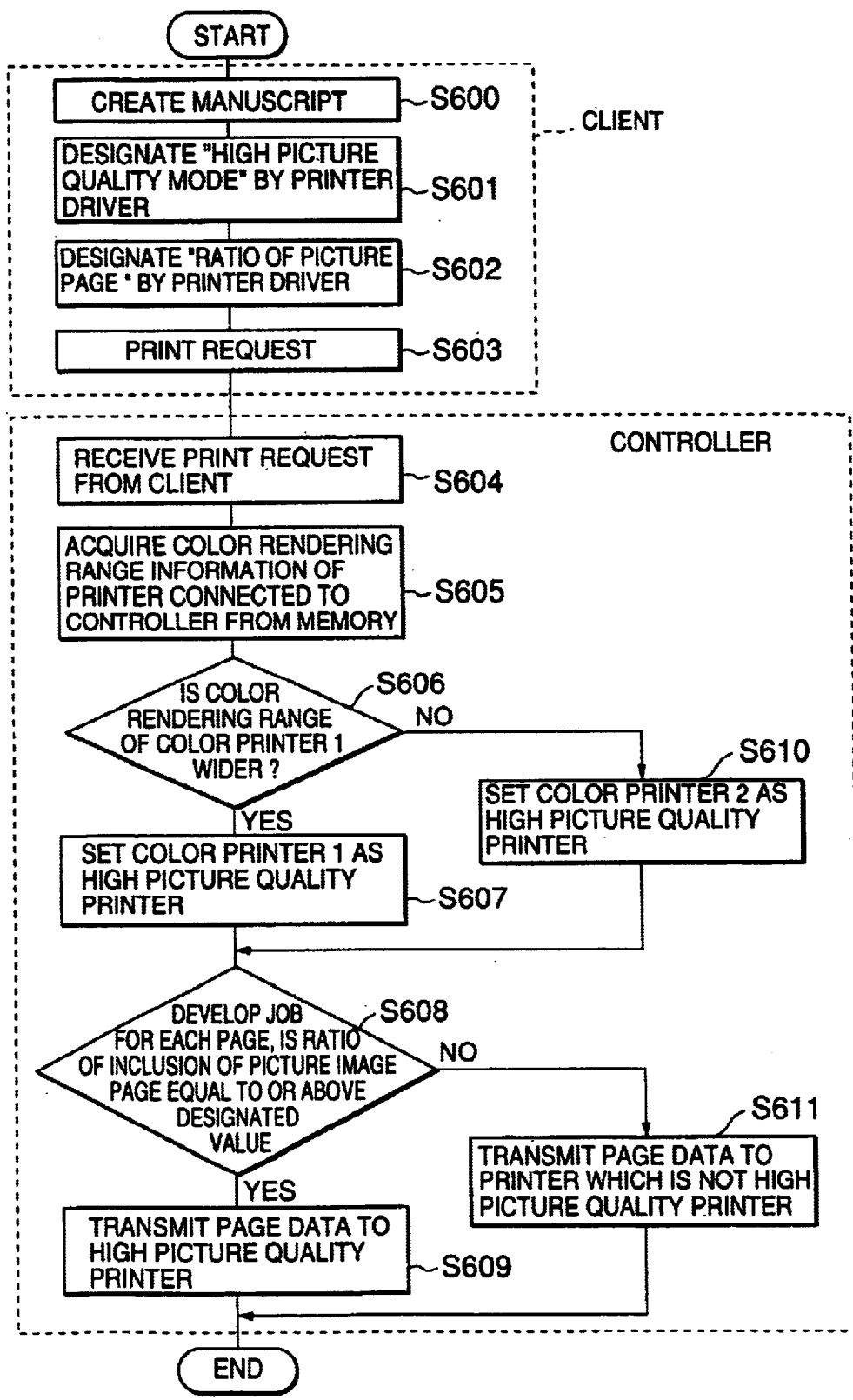
FIG. 15 is a flowchart showing a second flow of the judgment processing for a "page in which a high picture quality is required"

In the distributed processing system according to the present invention, FIG. 15 shows a flow of second processing when a page including a raster image page is determined as a page requiring the high picture quality in a concrete example where the job for the page requiring the high picture quality is distributed to a color image forming apparatus having an engine characteristic with the high color reproduction capability every page unit. FIG. 15 is a flowchart showing a first flow of "a page in which the high picture quality is required."

An operator first creates a document by the documentation application on the client PC 101 (S600). Subsequently, when a print command is issued from the application, the printer driver screen shown in FIG. 9 appears and the "high picture quality" mode is selected (S601). In the "high picture quality" mode, a page in which the high picture quality is required is designated under the condition that "the ratio of a picture page" is included, and that ratio is inputted as a numeric value (S602). When the "OK" button is selected, a print request is transmitted from the client PC 101 to the printer controller 104 through the LAN 105 (S603). Upon receiving the print request from the client PC 101 (S604), the printer controller 104 acquires the color rendering range information of the color printers 102 and 103 connected to the printer controller 104 from the memory on the printer controller 104 (S605). The color rendering range information table and the color printer profile such as shown in FIGS. 6 and 7 exist on the memory of the printer controller. The printer controller 104 compares the color rendering range of the color printer 103 with that of the color printer 104 from the obtained color rendering information for wideness/narrowness (S606) and, if the color rendering range of the color printer #1 (102) is wide (Yes in S606), the color printer #1 (102) is set as the high picture quality printer (S607). In addition, if the color printer #1 (102) has the narrow color rendering range (No in S606), the color printer #2 (103) is set as a high picture quality printer. Then, the print job transmitted from the client PC 102 is developed in accordance with each page as described with reference to FIG. 2, and a judgment is made upon whether it is a page in which the high picture quality is required based on whether that page includes a picture image at a designated ratio or above (S608). If it is a page in which the high picture quality is required (Yes in S608), the page data is transmitted to the high picture quality printer (S609). Further, in case of the page which is determined as a page requiring no high picture quality (No in S608), the page data is transmitted to the printer which is not the high picture quality printer. For example, when the color printer #1 (102) is set as the high picture quality printer, the page requiring the high picture quality is transmitted to the color printer #1 (102). In addition, the page requiring no high picture quality is transmitted to the color printer #2 (103).

The distributed processing system according to the present invention constitutes the first image forming apparatus with the high image formation processing capability by an image forming apparatus adopting the quadruple tandem color mode and the second image forming apparatus with the low image formation processing capability by an image forming apparatus adopting the one-drum mode, distributes the job to the second image forming apparatus every page unit in case of monochrome pages, and distributes the job to the first image forming apparatus adopting the quadruple tandem color mode every page unit in case of color pages, thereby executing the distributed processing of image formation.

In such a case, the distribution server may comprise: analyzing means for analyzing how many color pages and how may monochrome pages are included in one image formation job respectively; and switching means for switching to job distribution in units of copies when a difference between the number of color pages and the number of monochrome pages exceeds a fixed ratio based on an analysis result obtained by the analyzing means.

Figure 16:
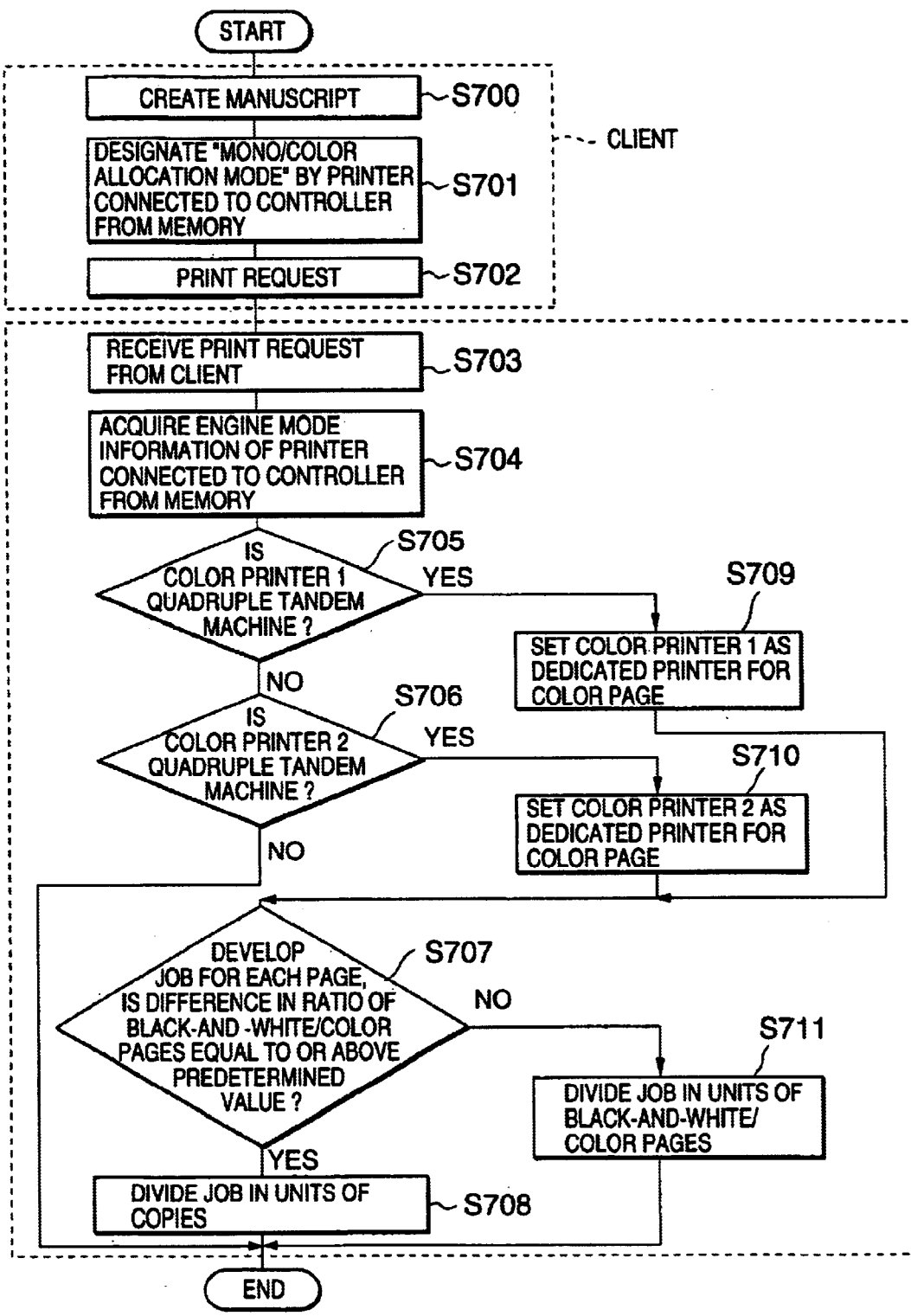
FIG. 16 is a flowchart showing a flow of analysis processing for the number of monochrome/color pages.

FIG. 16 shows a flow of monochrome/color page number analysis processing which is an embodiment of the operation of the distributed system according to the above-described structure.

An operator first creates a document by the documentation application on the client PC 101 (S700). Subsequently, when a print command is issued from the application, the printer driver screen shown in FIG. 9 appears and the "monochrome/color allocation" mode is selected (S701). When the "OK" button is selected, a print request is transmitted from the client PC 101 to the printer controller 104 via the LAN 105 (S702). Upon receiving the print request from the client PC 101 (S703), the printer controller 104 acquires engine mode information of the color printers 102 and 103 connected to the printer controller 104 from the memory of the printer controller 104 (S704). The engine mode information is information indicative of the one-drum mode or the quadruple tandem mode. The printer controller 104 first makes a judgment upon whether the color printer #1 (102) is the quadruple tandem machine (S705) from the obtained engine mode information. If the color printer #1 (102) adopts the quadruple tandem mode (Yes in S705), the color printer #1 (102) is set as a dedicated printer for color pages. Further, if the color printer #1 (102) is not the quadruple tandem machine (No in S705), a judgment is then made upon whether the color printer #2 (103) is the quadruple tandem machine (S705). If the color printer #2 (103) adopts the quadruple tandem mode (Yes in S706), the color printer #2 (103) is set as the dedicated printer for color pages. Thereafter, the print job transmitted from the client PC 102 is developed in accordance with each page as described with reference to FIG. 2, whether it is a black-and-white page or a color page is recognized, and a total number of color pages and a total number of monochrome pages in one print job are counted (S707). If a ratio of the monochrome pages/color pages is a difference equal to above a predetermined value (Yes in S707), the job division every page unit is ceased, and the job is dividedly transmitted in units of copies (S708).

Further, when the ratio of the monochrome pages/color pages is smaller than a predetermined value (No in S707), the monochrome/color pages are subjected to the job divided transmission every page unit as shown in FIG. 13 (S711). For example, if the judgment ratio of the monochrome/color pages is set to 40% to 60%, since the ratio of the monochrome/color pages is 10/100=10% and 90/100 90% when the print job including 10 monochrome pages and 90 color pages has a turn, the ratio of the monochrome pages to the entire print job is small. In such a case, it is determined that the job allocation every page unit delays the time until completion of printing all the more to switch to the job allocation in units of copies (executing the processing of S708). Further, in case of 50 monochrome pages and 50 color pages, the ratio of monochrome/color pages is 50/100= 50% and 50/100=50% so that these value are within the judgment value of 40% to 60%, and the job allocation is carried out every page unit (executing the processing of S711).

Figure 17:
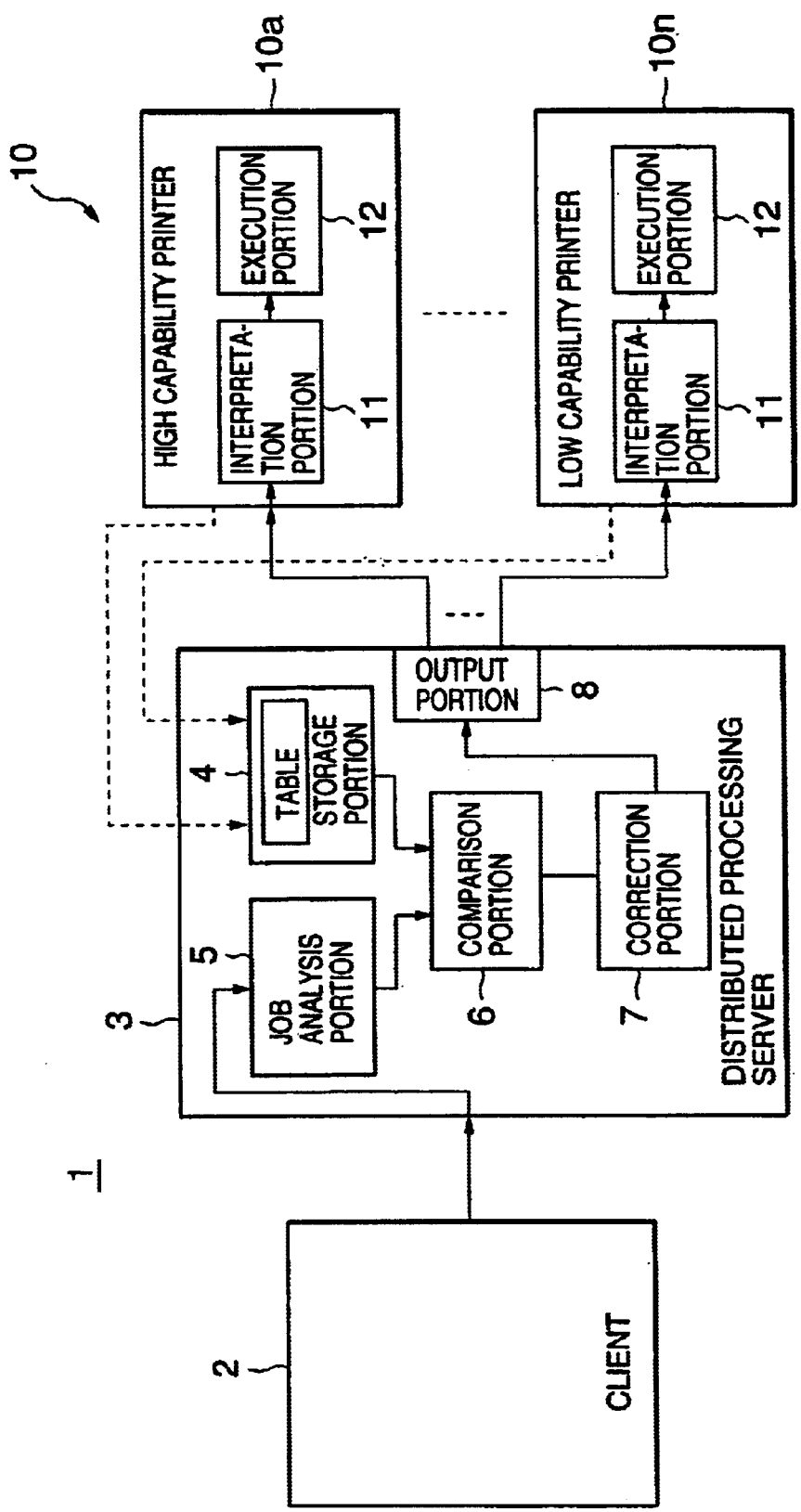
FIG. 17 is a block diagram showing a distributed processing system for an image forming apparatus according to a basic structure according to the present invention.

Although the structure according to the present invention is obvious from the above-described contents, the distributed processing system for an image forming apparatus according to the basic structure of the present invention will be described in conjunction with the block diagram of FIG. 17 for confirmation. In FIG. 17, the distributed processing system 1 for an image forming apparatus comprises: a client 2 for supplying an image; a distributed processing server 3 capable of executing the distributed processing on one job which is inputted from the client 2 and consists of a plurality of pages by using an image forming apparatus group 10 constituted of a plurality of image forming apparatuses 10n including at least one color image forming apparatus 10a; and at least two image forming apparatuses 10a and 10n which perform image formation of the job on a recording sheet based on a command from the server 3 and have different color image formation processing capabilities.

The distributed processing server 3 comprises: a storage portion 4 for previously storing data concerning respective image formation processing capabilities including color reproduction capabilities in the plurality of image forming apparatuses 10 and 10n; a job analysis portion 5 for analyzing the contents of the job supplied from the client 2 and an image formation request of the client 2 concerning the job; a comparison portion 6 for comparing a result of analysis performed by the job analysis portion 5 with data concerning capabilities of the plurality of image forming apparatuses stored in the storage portion 4; a correction portion 7 which corrects the image formation contents of a job to be supplied to the image forming apparatus 10a having the high image formation capability in accordance with the capability of the image forming apparatus 10n having the low image formation processing capability based on a comparison result of the comparison portion 6 and creates an image formation command for executing image formation with the corrected contents; and an output portion 8 which distributes and outputs the job corrected by the correction portion 7 to each of the plurality of image forming apparatuses 10a and 10n.

In the image forming apparatus group 10, the image forming apparatus 10a having the high image formation capability includes: an interpretation portion 11 for interpreting the image formation command added to the corrected job supplied from the distributed processing server 3; and an execution portion 12 for executing image formation in accordance with the interpreted contents. It is to be noted that the interpretation portion 11 and the execution portion 12 are also provided in the image forming apparatus 10n having the low capability.

In the distributed processing system 1 for an image forming apparatus having the above-described structure, the image forming apparatus group 10 includes a plurality of color image forming apparatuses 10a and 10n for executing one color image formation job which is inputted from the client 2 and consists of a plurality of pages, and the distributed processing server 3 corrects a color reproduction space for the job to be supplied to the first color image forming apparatus 10a having the engine characteristic with the high color reproduction capability so as to be matched with a color reproduction space of the second color image forming apparatus 10n having the engine characteristic with the low color reproduction capability and thereafter outputs it to the first color image forming apparatus 10a.

In the distributed processing system for an image forming apparatus shown in FIG. 17, although the distributed processing server 3 has such a structure as that one job which is inputted from the client 2 and consists of a plurality of pages is subjected to the distributed processing by at least two color image forming apparatuses 10a and 10n, the color reproduction space information of the respective color image forming apparatuses 10a and 10n may be held as a table by the storage portion 4 of the distributed processing server 3, and the distributed processing server 3 may use the held information to correct the color image forming apparatus 10a having the engine characteristic with the high color reproduction capability so as to be matched with the color reproduction space of the color image forming apparatus 10n having the engine characteristic with the low color reproduction capability, thereby performing image formation.

Further, in the distributed processing system for an image forming apparatus illustrated in FIG. 17, the job may be distributed to the color image forming apparatus 10a having the engine characteristic with the high color reproduction capability every page unit to form an image in case of a page requiring the high picture quality, and the job may be distributed to the image forming apparatus 10n having the engine characteristic with the low color reproduction capability every page unit to form an image in case of any other page.

Incidentally, in the distributed processing system for an image forming apparatus depicted in FIG. 17, the image forming apparatus 10a having the high image formation processing capability may be constituted of the first image forming apparatus adopting the quadruple tandem color mode, and the image forming apparatus 10n having the image formation processing capability may be constituted of the second image forming apparatus adopting the one-drum mode. Moreover, it is possible to adopt such a structure as that the job is distributed to the second image forming apparatus 10n every page unit in case of a monochrome page whilst the job is distributed to the first image forming apparatus 10a adopting the quadruple tandem color mode every page unit in case of a color page so that image formation is subjected to the distributed processing. It is to be noted that the operation in this case is as described above with reference to FIG. 16.

Additionally, in the distributed processing system for an image forming apparatus shown in FIG. 17, the plurality of image forming apparatuses may be configured by connecting at least two or more image forming apparatuses having different image formation capabilities to the distributed processing server in parallel and one job supplied from the client may be distributed in accordance with each processing suitable for each image forming apparatus to carry out the parallel processing.

Moreover, in the distributed processing system for an image forming apparatus shown in FIG. 17, the image forming apparatus having the low image formation processing capability may be constituted of a monochrome image forming apparatus.

In the distributed processing system for an image forming apparatus depicted in FIG. 17, the client, the distributed server and the plurality of image forming apparatuses may be connected to a local area network (LAN) to be image-formation-networked.

Furthermore, in the distributed processing system for an image forming apparatus shown in FIG. 17, there may be provided a sorter for sorting the recording sheet on which images are recorded by each of the plurality of image forming apparatuses and which is outputted.

Additionally, in the distributed processing system for an image forming apparatus illustrated in FIG. 17, the image forming apparatus may be constituted of a print device for performing printing based on print data supplied from the client side through the distribution server.

Further, in the distributed processing system for an image forming apparatus shown in FIG. 17, the image forming apparatus may perform printing based on print data supplied from the client side through the distribution server and may be constituted of a plain paper copier (PPC) which also has a copying function as a single unit.

With the above-described structure, according to the present invention, when performing tandem print/copy between the color printers having different engine characteristics, by correcting the color printer having the engine characteristic with the high color reproduction capability so as to be matched with the color reproduction space of the color printer having the engine characteristic with the low color reproduction capability and distributing the job in units of copies instead of pages, the labor of the sorting operation after print out can be saved and unification of coloring as an output result between different output devices can be also realized.

Also, by holding the profile of the color rendering range information on the printer controller, there can be a merit such that the memory of the client PC is less used as compared with the case where the arithmetic operation information profile is held on the client PC and the labor of a user for installing the profile to the client PC can be also saved.

Additionally, in the present invention, by distributing the job to the color printer having the engine characteristic with the high color representation capability every page unit in case of a page requiring the high picture quality and distributing the job to the color printer having the engine characteristic with the low color representation capability every page unit in case of any other page, a user can obtain an expected output result with respect to a page which requires the high picture quality in particular among color pages.

What is claimed is:

1. A distributed processing system for an image forming apparatus, comprising a client for supplying an image; a distributed processing server capable of performing distributed processing for one job, which is inputted from said client and which consists of a plurality of pages, by a plurality of image forming apparatuses including at least one color image forming apparatus; and at least two image forming apparatuses which form an image of said job on a recording sheet based on a command from said server and which have different color image formation processing capabilities, said distributed processing server comprising a storage portion for previously storing data concerning the respective image formation processing capabilities including color reproduction capabilities in said plurality of image forming apparatuses; a job analysis portion for analyzing the contents of said job supplied from said client and an image formation request of said client concerning said job; a comparison portion for comparing an analysis result by said job analysis portion with data concerning capabilities of said plurality of image forming apparatuses stored in said storage portion; a correction portion for correcting the image formation contents of a job to be supplied to said image forming apparatus having a high image formation capability in accordance with a capability of said image forming apparatus having a low image formation processing capability based on a comparison result of said comparison portion to create an image formation command for performing image formation with the corrected contents; and an output portion for distributing and outputting said job corrected by said correction portion to each of said plurality of image forming apparatuses, said image forming apparatus having the high image formation capability among said plurality of image forming apparatuses comprising an interpretation portion for interpreting said image formation command added to said corrected job supplied from said distributed processing server; and an execution portion for executing image formation in accordance with the interpreted contents.

2. The distributed processing system for the image forming apparatus according to claim 1, wherein said plurality of image forming apparatuses include a plurality of color image forming apparatuses for executing one color image formation job which is inputted from said client and which consists of a plurality of pages, and said distributed processing server corrects the color reproduction space of a job to be supplied to a first color image forming apparatus having an engine characteristic of a high color reproduction capability so as to be matched with the color reproduction space of a second color image forming apparatus having an engine characteristic of a low color reproduction capability, and then outputs it to said first color image forming apparatus.

3. The distributed processing system for the image forming apparatus according to claim 2, wherein in case of a page requiring a high picture quality, a job is distributed every page unit to said first color image forming apparatus having an engine characteristic of a high color reproduction capability, and in case of any other page, a job is distributed every page unit to said second color image forming apparatus having an engine characteristic of a low color reproduction capability.

4. The distributed processing system for the image forming apparatus according to claim 3, wherein a user can operate a printer drive provided in said client to select the distribution of said job of a page requiring a high picture quality to said first color image forming apparatus having an engine characteristic of a high color reproduction capability every page unit.

5. The distributed processing system for the image forming apparatus according to claim 3, wherein a user can operate an operation panel provided in said color image forming apparatus to select the distribution of said job of a page requiring a high picture quality to said first color image forming apparatus having an engine characteristic of a high color reproduction capability every page unit.

6. The distributed processing system for the image forming apparatus according to claim 3, wherein a page including a raster image page is judged to be said page requiring a high picture quality.

7. The distributed processing system for the image forming apparatus according to claim 3, wherein a page having a ratio of an area of a raster image occupying in said page equal to or above a certain value is judged to be said page requiring a high picture quality.

8. The distributed processing system for the image forming apparatus according to claim 1, wherein said image forming apparatus having said low image formation processing capability is constituted of a monochrome image forming apparatus.

9. The distributed processing system for the image forming apparatus according to claim 1, wherein, in said distributed processing server capable of performing distributed processing for one job which is inputted from said client and which consists of a plurality of pages by at least two color image forming apparatuses, color reproduction space information of each color image forming apparatus is held in said distributed processing server; and said distributed processing server uses said held information to correct said color image forming apparatus having an engine characteristic of a high color reproduction capability so as to be matched with the color reproduction space of said color image forming apparatus having an engine characteristic of a low color reproduction capability, thereby performing image formation.

10. The distributed processing system for the image forming apparatus according to claim 1, wherein, in case of a page requiring a high picture quality, a job is distributed to said color image forming apparatus having an engine characteristic of a high color reproduction capability every page unit to form an image, and in case of any other page, a job is distributed to said image forming apparatus having an engine characteristic of a low color reproduction capability every page unit to form an image.

11. The distributed processing system for the image forming apparatus according to claim 1, wherein said image forming apparatus having the low image formation processing capability is constituted of a monochrome image forming apparatus.

12. The distributed processing system for the image forming apparatus according to claim 1, wherein said image forming apparatus having the high image formation processing capability is constituted of a first image forming apparatus adopting a quadruple tandem color mode while said image forming apparatus having the low image formation processing capability is constituted of a second image forming apparatus adopting a one-drum mode, and a job is distributed to said second image forming apparatus every page unit in case of a monochrome page while a job is distributed to said first image forming apparatus adopting the quadruple tandem color mode every page unit in case of a color page, thereby subjecting image formation to distributed processing.

13. The distributed processing system for the image forming apparatus according to claim 12, wherein said distribution server further comprises analyzing means for analyzing how many color pages and how many monochrome pages are included in one image forming job; and switching means for switching to job distribution of a copy unit when there is a difference between the number of color pages and the number of monochrome pages equal to or above a certain ratio as an analysis result by said analyzing means.

14. The distributed processing system for the image forming apparatus according to claim 1, wherein said plurality of image forming apparatuses are constituted so as to connect two or more image forming apparatuses having different image formation capabilities to said distributed processing server in parallel, and one job supplied from said client is distributed for each processing suitable for individual image forming apparatuses to be subjected to parallel processing.

15. The distributed processing system for the image forming apparatus according to claim 1, wherein said image forming apparatus having the low image formation processing capability is constituted of a monochrome image forming apparatus.

16. The distributed processing system for the image forming apparatus according to claim 1, wherein said client, said distributed server and said plurality of image forming apparatuses are connected to a local area network (LAN) to be image-formation-networked.

17. The distributed processing system for the image forming apparatus according to claim 1, wherein there is provided a sorter for sorting recording sheets on which images are recorded and outputted by each of said plurality of image forming apparatuses.

18. The distributed processing system for the image forming apparatus according to claim 1, wherein said image forming apparatus is constituted of a printer for performing printing based on print data supplied from said client side through said distribution server.

19. The distributed processing system for the image forming apparatus according to claim 1, wherein said image forming apparatus performs printing based on print data supplied from said client side through said distribution server and is constituted of a plain paper copier (PPC) which also has a copying function as a single unit.

* * * * *